(No Model.)
F. W. VOSSMER.
TRICYCLE.
No. 309,667. Patented Dec. 23, 1884.
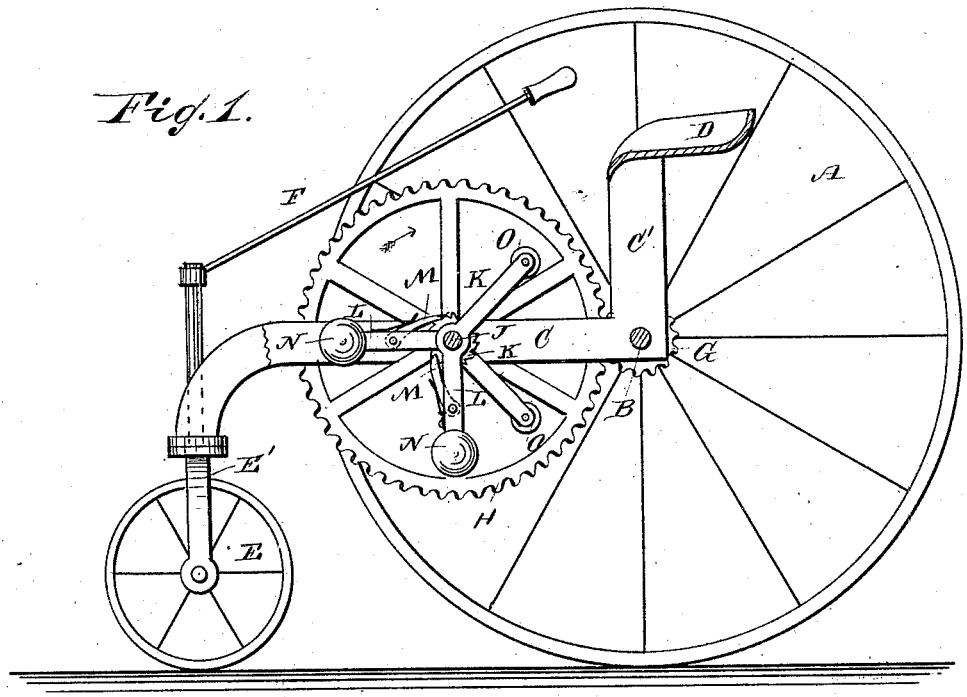
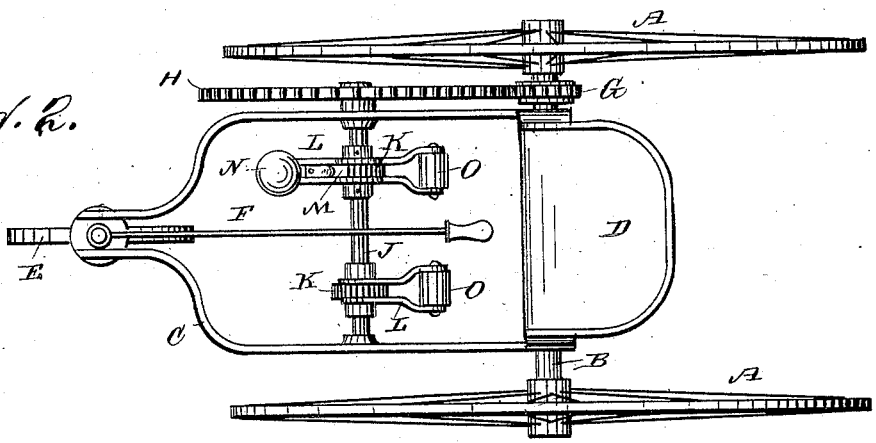
WITNESSES:
INVENTOR:
Frederick W. Vossmer
BY
ATTORNEYS.

UNITED STATES PATENT OFFICE.

FREDERICK W. VOSSMER, OF HAMILTON, BERMUDA.

TRICYCLE.

SPECIFICATION forming part of Letters Patent No. 309,667, dated December 23, 1884.

Application filed September 16, 1884. (No model.)

*To all whom it may concern:*

Be it known that I, FREDERICK W. VOSSMER, of Hamilton, Bermuda, have invented a new and Improved Tricycle, of which the following is a full, clear, and exact description.

The object of my invention is to provide a new and improved tricycle, which is simple in construction, light, strong, and durable, and requires comparatively little power to travel very rapidly.

The invention consists in the construction and arrangement of parts, as will be hereinafter fully described and claimed.

Reference is to be had to the accompanying drawings, forming a part of this specification, in which similar letters of reference indicate corresponding parts in both the figures.

Figure 1 is a longitudinal sectional elevation of my improved tricycle. Fig. 2 is a plan view of the same.

The two driving-wheels, A, are mounted rigidly on the axle B, supporting the vehicle-frame C, provided at its rear end with two standards, C', supporting the seat D. The steering-wheel E is journaled in a fork, E', arranged to turn in the front part of the frame, and from the upper end of a rod connected with the said fork a rod, F, projects up to the seat.

Near one end of the axle B a pinion, G, is mounted, which engages with a cog-wheel, H, mounted outside of the frame C on a shaft, J, journaled in the frame C, parallel with and a short distance in front of the axle.

On the shaft J two ratchet-wheels, K, are mounted, and at each ratchet-wheel a rocking pawl-frame, L, is mounted on the shaft, the said frames carrying pawls M, to engage with the wheels K. The pawl-frames L have weights N on one end, and pedals O on the other ends. The weights swing the front ends of the frames L down, to give the pawls M a fresh grip. The two rocking pawl-frames L are depressed alternately, and by means of their pawls acting on the ratchet-wheels K they revolve the shaft J and cog-wheel H, from which the pinion G is revolved, whereby the axle B and wheels A are revolved. The gearing is so arranged that every time a rocking frame L is depressed the wheels A make one revolution. Great speed is thus obtained with very little power, and the vehicle is simple in construction and strong.

Having thus described my invention, I claim as new and desire to secure by Letters Patent—

In a tricycle, the combination, with the frame C, axle B, drive-wheels A, and pinion G, of the shaft J, cog-wheel H thereon outside of the frame, angle-frames L, pivoted on the shaft J, and provided at their opposite ends with pedals O and weights N, pawls M, also on said frames, and ratchet-wheels K, rigidly secured to shaft J for the pawls to act on, as described.

FREDERICK W. VOSSMER.

Witnesses:
 OSCAR F. GUNZ,
 EDGAR TATE.